Sept. 12, 1961  H. W. NORRBY  2,999,252
SELF CONTAINED BOAT TRAILER

Filed Aug. 11, 1958  2 Sheets-Sheet 1

INVENTOR.
HAROLD W. NORRBY
BY Smith & Tuck

Sept. 12, 1961 H. W. NORRBY 2,999,252
SELF CONTAINED BOAT TRAILER
Filed Aug. 11, 1958 2 Sheets-Sheet 2
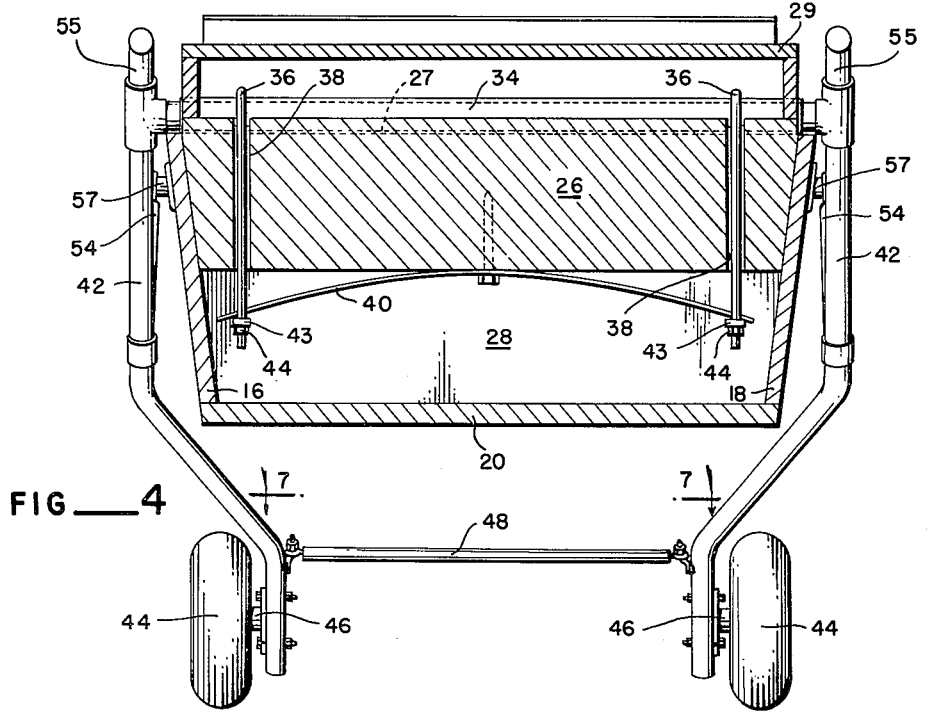
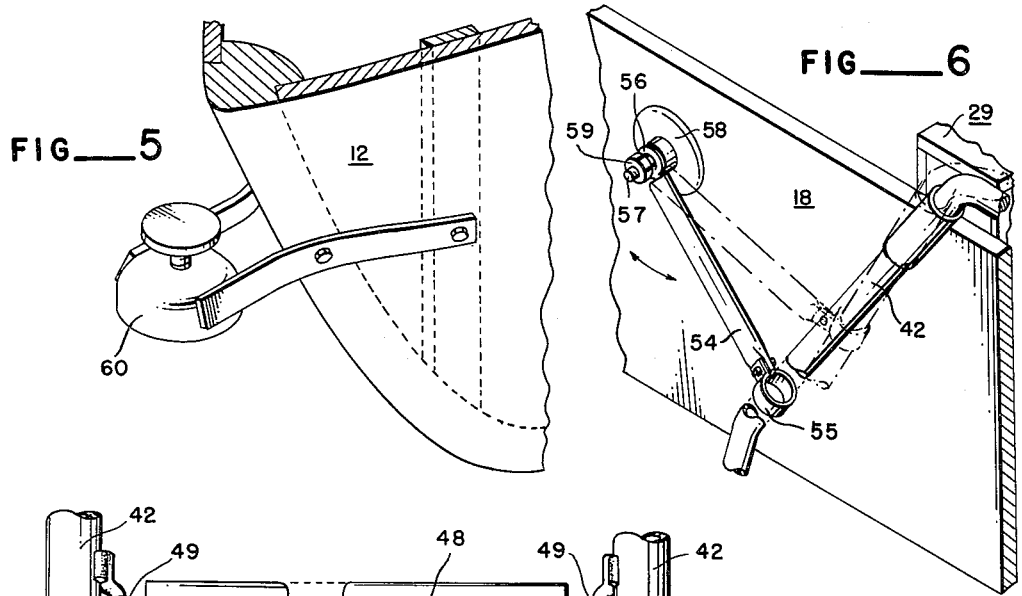
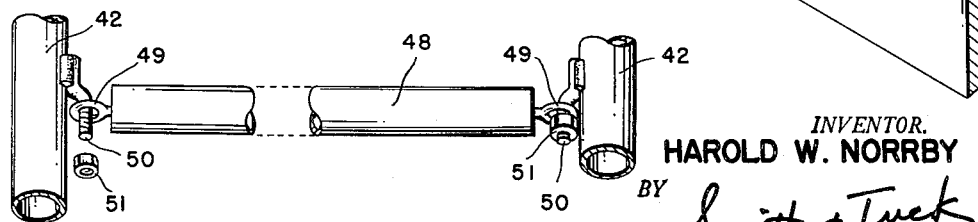
INVENTOR.
HAROLD W. NORRBY
BY
Smith & Tuck

United States Patent Office 2,999,252
Patented Sept. 12, 1961

2,999,252
SELF CONTAINED BOAT TRAILER
Harold W. Norrby, 5522 Kenwood Place, Seattle 3, Wash.
Filed Aug. 11, 1958, Ser. No. 754,482
5 Claims. (Cl. 9—1)

This invention relates to improvements in self contained boat trailer and more particularly, to a boat hull having rotatably mounted wheeled-struts to be stowed within the boat hull during boating operations, and adapted to be swung to and secured in ground engaging position when it is desired to beach the boat or to portage it from place to place.

Among the more important objects of this invention have been: the provision in a boat hull of apparatus whereby the boat may be converted into a trailer for attachment to a motor vehicle, in order that the same may be transported from place to place, and which apparatus may be shipped within the boat hull and out of the way during normal boating operations; to provide rotatably mounted wheeled-struts which may be moved from the stowed position within the hull to externally thereof while the boat is in the water and without the necessity of the operator leaving the boat; and to provide wheeled apparatus converting a boat hull into a trailer for transportation purposes in which there is shock absorbing means between the hull and the ground engaging trailer apparatus to reduce and absorb the effects of road shocks and vibration during ground transportation of the boat.

Other objects of the invention include the provision of simple and easily constructed apparatus which may be adapted to use with a wide variety of boats, and which is capable of being shipped and unshipped after launching or before beaching with a relative minimum of strength and skill on the part of the user.

These and other objects of the invention will be more apparent during the course of the following specification in which is set forth and described a preferred embodiment of my invention. It will of course be understood by those skilled in the art that changes and modifications may be made without departing from the spirit of the invention. Such changes and modifications as fairly fall within the scope of the subjoined claims are contemplated as a part of this invention.

In the drawings:

FIGURE 4 is an enlarged transverse vertical section taken in the plane 4—4 of FIGURE 3, showing the trailer apparatus in transporting position;

FIGURE 5 is a fragmentary perspective view at the bow of the boat;

FIGURE 6 is an enlarged fragmentary perspective view showing the brace means for a wheeled-strut; and FIGURE 7 is a detailed view taken from the plane 7—7 of FIGURE 4.

Figure 1:
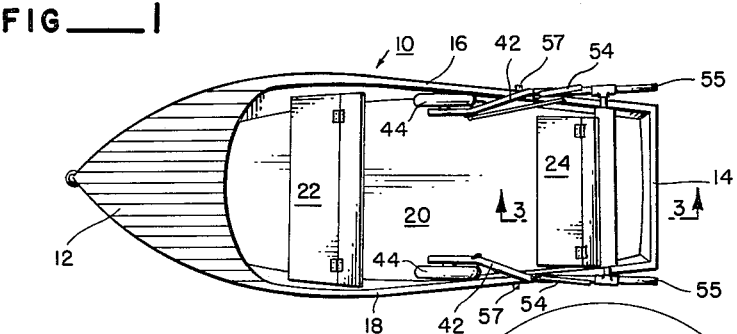
FIGURE 1 is a plan view of the boat hull showing the beaching gear stowed therein.

A boat typical of those with which my invention is particularly useful is of the type commonly used by fishermen and sportsmen and which may be rowed or operated with relatively small outboard motor units. At least, by way of illustration, I have shown such hull, it being borne in mind that the invention is not to be limited thereto as obviously it will be useful with many small boats.

A boat hull, indicated as a whole by the numeral 10, comprises a bow 12, stern transom 14, sides 16 and 18, and a bottom 20. Thwarts 22 and 24 provide seating facilities for the users of the boat. Normally an outboard motor will be clamped to the transom 14 at the rear of the boat.

A transverse beam 26 is fixedly supported adjacent the stern of the boat in spaced relation above the bottom 20. In this instance the beam 26 is mounted between transverse walls 28, 28 to which it may be secured by screw fasteners 30. The walls 28, 28 are attached to the boat bottom by bracing means 32 and, in suitable similar manner, to the sides 16 and 18 adjacent the ends of the beam 26. The upper face of beam 26 preferably has groove 27.

An axle or shaft 34 is superposed upon said beam in groove 27 along its longitudinal axis and normally extends beyond the sides 16 and 18 of the boat hull. Axle 34 is traversed by downwardly biased saddle means which span the axle and secure the same to the beam. Preferably such saddle means comprises U-bolts 36 which are slipped over the axle 34 and passed downwardly through openings 38 through the beam 26. A leaf spring 40 is engaged at the ends thereof by a cross member 43 extending between the legs of the U-bolt 36 and there secured by nuts or other fastening means 44 at the lower extremities of the U-bolts. Leaf spring 40 arches upward between its ends and intermediately bears on the under side of beam 26. The spring ends are normally under compression through adjustment of the position of the cross straps 43 on the lower ends of the U-bolts.

It will be apparent that shocks transmitted to the shaft 34 will tend to cause the U-bolts 36 to rise relative beam 26 against the action of the leaf spring 40. When the force of the shock has been dissipated the spring 40 will again draw the shaft 34 into close engagement and positioning on the top of beam 26. Preferably shaft 34 and the upper ends of the U-bolts 36 are boxed in between upward extensions of the walls 28, 28 under cover panel 29.

Figure 2:
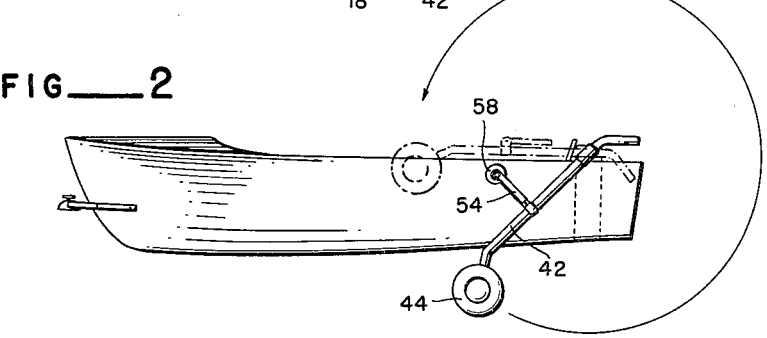
FIGURE 2 is a side view of the boat hull equipped with my trailer apparatus, the latter being shown in the beaching and transporting position.
Figure 3:
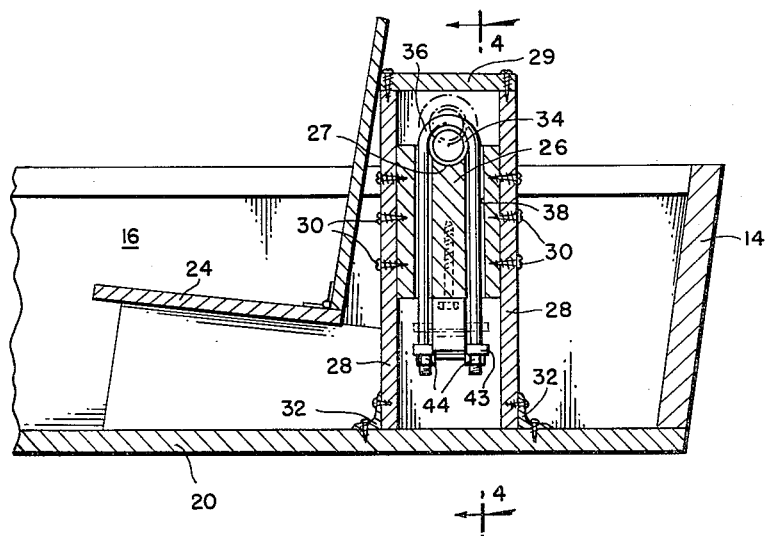
FIGURE 3 is an enlarged fragmentary longitudinal section at the stern of the boat taken on line 3—3 of FIGURE 1.

At each end of shaft 34 I provide a downwardly extending strut 42 which may be swung about to the axis of the shaft 34 from the shipped position shown in FIGURE 1 to the transporting position shown in FIGURE 2.

Referring particularly to FIGURE 4 it will be seen that the struts 42 are inwardly bowed to place the wheels 44 on the ground engaging ends of the strut inside the hull edge or generally beneath the hull. The inward bow of the struts also permits wheels 44 to swing to within the hull when shipped. Wheels 44 are mounted on strut axles 46 for free rotation, the axles being suitably attached to the lower ends of struts 42.

A link 48 is normally disposed between struts 42, 42 during beaching and transporting to stiffen the trailer apparatus as may be seen in FIGURES 4 and 7. Link 48 is shown as having attached an eye 49 which is engaged over a stud 50 to be secured thereon by a nut 51. Depending upon the wishes of the boatman, link 48 may be left in place when the wheels are shipped, or it may be removed as shown in FIGURE 1.

In the transporting position of the trailer apparatus a brace 54 is disposed between each strut 42 and a side of the boat hull. Brace 54 as shown in FIGURE 6 is attached to the strut 42 by an eye 55 and has at its opposite end an eye 56 which slips over stud 57, outstanding from a base plate 58, at the side of the hull. Nut 59 secures the brace end to stud 57.

At the bow 12 the boat hull is provided with a conventional trailer hitch element 60 for engagement with the conventional ball normally provided at the rear of a motor vehicle.

To facilitate shipping and unshipping of the trailer apparatus an extension 55 on each strut serves as a handle, readily available to the boatman. Extension 55 can be heavy and function as a counter weight to facilitate manipulation of the struts from the down to the inboard position.

Having thus described my invention, I claim:

1. A self-contained boat trailer, comprising: a boat hull having a transverse beam fixedly supported adjacent the stern in spaced relation above the bottom, an axle superposed along said beam and extending beyond the sides of the hull, a pair of U-bolts straddling said axle and beam, one on each side of the longitudinal median of said boat, passing downward to a point spaced from the underside of said beam, a leaf spring having each end connected to the lower extremities of one of said U-bolts in spaced relation to said beam underside and intermediately bearing on the beam underside, a strut rotatably depending from each end of said axle externally of the hull, a wheel on each strut remote from the axle, and detachable, brace means between each strut and the boat hull to maintain said strut wheel in ground-engaging position relative the hull.

2. The structure according to claim 1 in which there is a link between said struts adjacent the wheels thereon.

3. A self-contained boat trailer, comprising: a boat hull having a transverse beam fixedly supported adjacent the setrn in spaced relation above the bottom, an axle superposed along said beam and extending beyond the sides of the hull, saddle means spanning the axle and securing the same to the beam, said saddle means being vertically movable relative said beam to permit said axle to rise therefrom, spring means beneath said beam and operatively connected to said saddle means to bias the same downward, a strut rotatably depending from each end of said axle externally of the hull, a wheel on each strut, and detachable, brace means between each strut and the boat hull and operable to maintain said strut wheel in ground-engaging position relative the hull.

4. A self-contained boat trailer, comprising: a boat hull having a transverse beam fixedly supported adjacent the stern, an axle superposed along said beam and extending beyond the sides of the hull, saddle means overlying and movably holding said axle to said beam, spring means operably associated with said saddle means and said beam to bias the saddle means down onto said axle, a strut rotatably depending from each end of said axle externally of the hull, a wheel on each strut remote from the axle, and means between each strut and the boat hull to maintain said strut wheel in ground-engaging position relative the hull.

5. The structure according to claim 4 in which each strut is inwardly bowed to place the wheel thereon inside the hull edge in the ground-engaging position.

References Cited in the file of this patent

UNITED STATES PATENTS

| | | |
|---|---|---|
| 1,939,863 | Seiter | Dec. 19, 1933 |
| 2,457,567 | Kuns | Dec. 28, 1948 |
| 2,460,935 | Henningsen | Feb. 8, 1949 |
| 2,515,564 | Mercer | July 18, 1950 |
| 2,831,203 | Kanarr | Apr. 22, 1958 |